Aug. 11, 1953 — W. A. FLUMERFELT — 2,648,558
EXPOSED SEAT UNIVERSAL JOINT
Filed Sept. 2, 1950
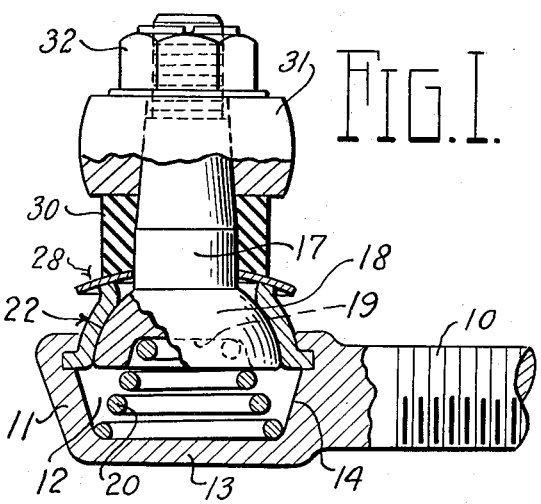
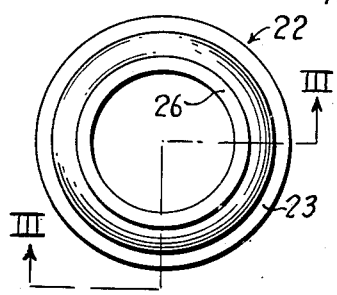
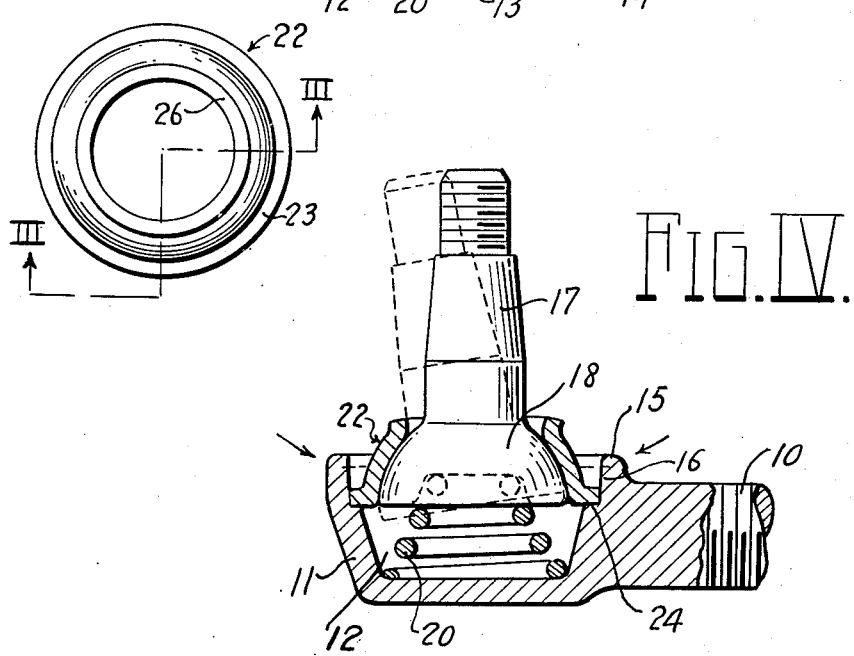
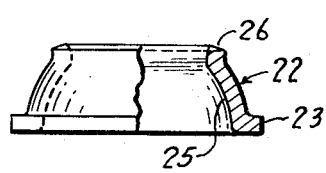
INVENTOR.
William A. Flumerfelt
BY Edmund B Whitcomb
ATTORNEYS Patented Aug. 11, 1953

2,648,558

UNITED STATES PATENT OFFICE 2,648,558

EXPOSED SEAT UNIVERSAL JOINT

William A. Flumerfelt, Columbus, Ohio, assignor to The Columbus Auto Parts Company, Columbus, Ohio, a corporation of Ohio Application September 2, 1950, Serial No. 182,947

1 Claim. (Cl. 287—90)

This invention relates to universal joints in which a relatively shallow or half housing unit and integral tie rod connection has clamped thereto a separately hardened ring-shaped half ball seat, said seat being fixed at one end of said housing with substantially the entire seat being located outside the housing.

The object of the invention is to provide a relatively cheap construction with a minimum use of material and number of parts in which the ball seat may be of thin metal separately hardened and securely held to the housing by spinning the top rim of the cavity of the housing metal around a flange on the seat member.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure I is a vertical section of my improved joint;

Figure II is a top plan view;

Figure III is a section on the line III—III of Figure II; and

Figure IV is a vertical sectional view showing the parts being assembled and, on dotted lines, the oscillation of the stud.

In the embodiment illustrated, the connection 10 has an integral substantially "half-sized" housing 11 which is forged in one piece with a cavity 12 and solid end 13, the cavity being naturally flared with the side wall 14 during forging and also formed with an upstanding rim 15 (Figure IV) formed by machining a short cylindrical bore 16 in the open end of cavity 12.

The ball stud 17 has in the particular embodiment shown, a half ball part 18 with a central bottom recess 19 to form a bearing for the take-up spring 20.

I provide a separately hardened ring-shaped seat member 22 of thin metal having a flange 23 of an outside size to fit into the cylindrical bore 16 of the "half" housing 11, the flange 23 resting on the ledge 24 formed at the bottom of the bore 16. As clearly shown in Figure III, the seat ring 22 has a spherical seating surface 25 and a flared open neck 26, the half ball 18 seating in the seat bearing surface 25 and the stud 17 extending through said neck 26 of the seat 22.

In assembly, the spring 20 is placed in the bottom of the cavity 12. The seat 22 is located over the stud 17 to fit onto the half ball part 18. The combined half ball 18 and seat 22 are then inserted into bore 16 until the flange 23 of the seat rests upon ledge 24, compressing spring 20. The parts are shown thus in Figure IV and the rim 15 of the housing is then spun down over flange 23 to securely clamp and fix said seat 22 to the housing 11 at its upper edge portion as shown, with substantially the entire seat, half ball and stud parts extending outside the housing so that the housing or base portion 11 receives principally the spring 20, the base 11 thereby closing the socket and the seat 22 forming the principal housing for the half ball portion 18 as well as forming the seat therefor. Thus, the material required for the housing is greatly reduced and the single seat element 22 forms the principal part of the housing for the half ball and socket joint.

A suitable dust guard 28 closely surrounding the half ball stud 17 is connected with the stud 17 so as to slide over the end surface of the flared seat end 26, being spaced substantially from the housing 11. The guard 28 is suitably held in place on stud 17 by a collar 30, interposed between the said guard 28 and the steering knuckle arm 31, the stud 17 being locked thereto by the usual end nut 32.

It is apparent that, within the scope of the invention, modifications and different arrangements may be made other than is herein disclosed, and the present disclosure is illustrative merely, the invention comprehending all variations thereof.

What I claim is:

A universal joint comprising, in combination, an integral shallow housing and tie rod connecting member, said housing having an integral solid end wall, a flared inner base portion and an open end opposite said closed end; a solid ring-shaped hardened seat member having a spherically-shaped inner bearing surface and an outward end portion extending from one end of said spherical portion to the end of the seat member; an outwardly extending flange at the other end of said seat member; a transversely extending ledge in the inner wall of said housing member, said ledge being located adjacent the open end of said housing and said flange on said seat member contacting said ledge; an inwardly extending flange at the open end of said housing contacting said seat flange to clamp the same on said ledge with the seat member located substantially outside said housing; an integral ball stud and half ball located in said housing with the spherical portion of said half ball contacting the spherical surface of said seat member and the stud extending through said seat member and contacting said outward end portion thereof in the extreme position of oscillation of said stud; and expanding spring means for supporting said ball stud member interposed between said half ball and the solid end wall of said housing.

WILLIAM A. FLUMERFELT.

References Cited in the file of this patent

UNITED STATES PATENTS

| Number | Name | Date |
|---|---|---|
| 1,899,645 | Sneed | Feb. 28, 1933 |
| 1,917,502 | Crawford et al. | July 11, 1933 |
| 2,189,266 | Klages | Feb. 6, 1940 |
| 2,236,062 | Katcher | Mar. 25, 1941 |
| 2,496,839 | Abramoska | Feb. 7, 1950 |
| 2,516,688 | Flumerfelt | July 25, 1950 |

FOREIGN PATENTS

| Number | Country | Date |
|---|---|---|
| 294,054 | Great Britain | July 19, 1928 |
| 368,030 | Italy | Nov. 12, 1938 |